(12) United States Patent
Brennan et al.

(10) Patent No.: US 10,320,940 B1
(45) Date of Patent: Jun. 11, 2019

(54) MANAGING GENERIC DATA

(71) Applicant: Symantec Corporation, Mountain View, CA (US)

(72) Inventors: James E. Brennan, Rancho Palos Verdes, CA (US); Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/316,635

(22) Filed: Jun. 26, 2014

(51) Int. Cl.
*G06F 15/16* (2006.01)
*H04L 29/08* (2006.01)

(52) U.S. Cl.
CPC .................. *H04L 67/32* (2013.01)

(58) Field of Classification Search
CPC ...... H04L 67/32; H04L 69/06; H04L 67/2833
USPC ........................................ 709/219, 220, 224
See application file for complete search history.

(56) References Cited

U.S. PATENT DOCUMENTS

| | | | | |
|---|---|---|---|---|
| 2006/0136872 | A1* | 6/2006 | Barr | G06F 9/44505 717/114 |
| 2010/0017798 | A1* | 1/2010 | Burkhardt | G06F 8/61 717/175 |
| 2012/0180036 | A1* | 7/2012 | Ran | G06F 8/60 717/171 |
| 2014/0032759 | A1* | 1/2014 | Barton | H04L 67/10 709/225 |

* cited by examiner

*Primary Examiner* — Normin Abedin
(74) *Attorney, Agent, or Firm* — Holland & Hart LLP

(57) ABSTRACT

According to at least one embodiment, a computer-implemented method for managing generic data is described. In one embodiment, a request may be received to customize the generic data. The generic data may be downloaded based at least in part on the request. The generic data may be customized for the computing device. The customized data may be installed on the computing device.

17 Claims, 6 Drawing Sheets

MANAGING GENERIC DATA

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies may be desirable to anyone who uses and relies on computers.

With the wide-spread of computers and mobile devices has come an increased presence of software packages for mobile devices. Software packages may be customized for a subset of customers or specific users. Currently, customizing the software packages is resource intensive and may consume temporary file resources.

SUMMARY

According to at least one embodiment, a computer-implemented method for managing generic data is described. In one embodiment, a request may be received to customize the generic data. The generic data may be downloaded based at least in part on the request. The generic data may be customized for the computing device. The customized data may be installed on the computing device.

In one embodiment, customizing the generic data may further comprise modifying the generic data based at least in part on one or more targeting parameters. In some embodiments, a URL may be generated and may comprise the one or more targeting parameters to customer the generic data. The URL may be generated by a server.

In some embodiments, a web browser may retrieve the one or more targeting parameters and customize the generic data based at least in part on the one or more targeting parameters. In some embodiments, the web browser may enable a user to download the customized data onto the computing device.

In further embodiments, a token may be created to customize the generic data, wherein the token is one or more of the targeting parameters. The token may uniquely identify at least one user or at least one group of users. In some embodiments, the generic data may be initially located on a content delivery network.

In some embodiments, customizing the generic data may further comprise modifying the generic data based at least in part on one or more targeting parameters locally stored on the computing device. The one or more targeting parameters unique to the computing device may be stored locally on the computing device. The one or more targeting parameters may be included within the URL. The one or more targeting parameters locally stored on the computing device may be retrieved. In some embodiments, installing the customized data may further comprise downloading the customized data to the computing device.

A computing device configured to manage generic data is also described. The device may include a processor and memory in electronic communication with the processor. The memory may store instructions that are executable by the processor to receive a request to customize the generic data. The instructions may download the generic data based at least in part on the request. The instructions may customize the generic data for the computing device. The instructions may install the customized data on the computing device.

A computer-program product to manage generic data is also described. The computer-program product may include a non-transitory computer-readable medium that stores instructions. The instructions may be executable by a processor to receive a request to customize the generic data. The instructions may download the generic data based at least in part on the request. The instructions may customize the generic data for the computing device and may install the customized data on the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
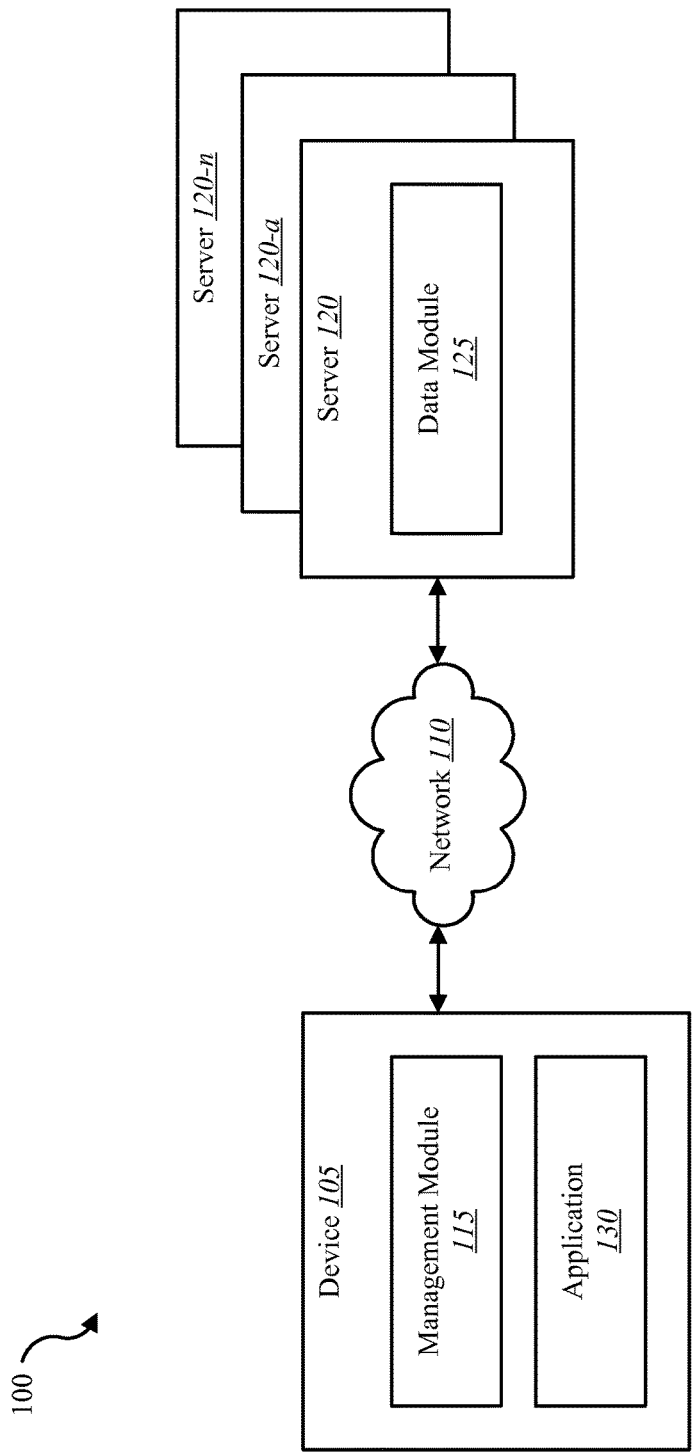
FIG. 1 is a block diagram illustrating an exemplary embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to managing generic data. More specifically, the systems and methods described herein relate to customizing generic data for a computing device. The generic data may be customized based on one or more parameters which may uniquely identify a user, group of users, and/or a computing device.

FIG. 1 is a block diagram illustrating one embodiment of an environment 100 in which the present systems and methods may be implemented. The environment may include a device 105, a server 120, and a network 110. In some embodiments, the systems and methods described herein may be performed on the device 105 or on the device 105 and the server 120. In some embodiments, the environment 100 may include multiple servers 120, 120-*a*, 120-*n*.

The device 105 may include one or more processors, one or more memory devices, and/or a storage device. Examples of the device 105 may include mobile phones, smart phones, tablets, personal digital assistants (PDAs), wearable computers, ultra-mobile PCs, a viewing device associated with a media content set top box, satellite set top box, cable set top box, DVRs, personal video recorders (PVRs), personal computing devices, computers, servers, etc. Additionally, the device 105 may represent a single device or multiple devices that may access the server 120.

In some embodiments, the device 105 may include a management module 115 and an application 130. The management module 115 may manage data. Data may comprise software programs, metadata, applications, and other forms of data used in computing applications. For example, the management module 115 may customize data to a particular user.

The application 130 may interface with the management module 115 and the server 120 via the network 110. Examples of the application 130 may include any combination of a program installed on a server, a program installed on a personal computer, a mobile application installed on a mobile computing device, a web browser, a web-based application (e.g., any combination of JavaScript, hypertext markup language (HTML), and cascading style sheets (CSS)), etc. The web browser may be a software application for retrieving, presenting, and/or traversing information over the network 110. In some embodiments, the web browser may construct files. Examples of a web browser include Firefox, Internet Explorer, Google Chrome, Opera, Safari and the like. In some embodiments, the application 130 may be installed on the device 105 to enable a user of the device 105 to interface with a function of server 115. For example, application 130 may allow device 105 to interface with a data module 125 on another device such as on the server 120.

The server 120 may serve one or more privileged services. For example, the server 120 may be one of an application server, catalog server, database server, content delivery network, proxy server, web server, or the like. In some embodiments, multiple servers 120, 120-*a*, 120-*n* may be present. The multiple servers 120-*n* may comprise a variety of types of servers. For example, the system 100 may comprise at least a content delivery network, a web server, and an application server. A content delivery network may be a distributed system of servers in multiple data centers across the Internet. The content delivery network may provide high availability and high performance of content to users. In some embodiments, the server 120 may include the data module 125. The data module 125 may perform functions relating to managing a generic software package.

In some cases, the device 105 may connect to the server 120 via the network 110. Examples of the network 110 include any combination of local area networks (LAN), wide area networks (WAN), virtual private networks (VPN), wireless networks (using 802.11, for example), cellular networks (using 3G and/or LTE, for example), etc. In some configurations, the network 110 may include the Internet. Thus, network 110 may include one or more gateway devices, access points, routers, switches, dynamic host configuration protocol (DHCP) servers, etc., that enable computing devices to connect to the internet.

Figure 2:
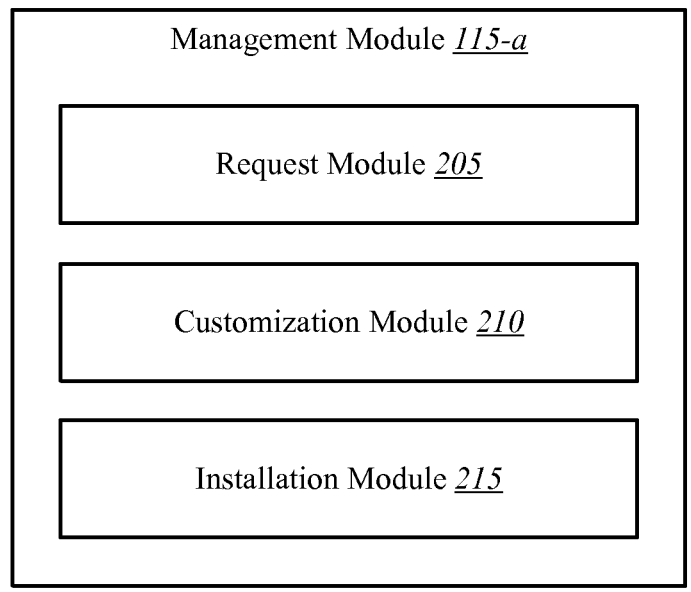
FIG. 2 is a block diagram illustrating one example of a management module.

FIG. 2 is a block diagram illustrating one example of a management module 115-*a*. The management module 115-*a* may be one example of the management module 115 depicted in FIG. 1. As depicted, the management module 115-*a* may include a request module 205, a customization module 210, and an installation module 215. The management module 115-*a* may include additional or fewer modules and capabilities in other embodiments. The management module 115-*a* may allow a user to install customized data to their device (e.g. device 105).

In one embodiment, the request module 205 may receive a request to customize generic data. For example, in some embodiments, a server may generate a URL and deliver the URL to a user. The user may then activate the URL. By activating the URL, the user may generate the request to retrieve and customize data. The data may be a generic software package. The URL may relay information regarding the customization of the data. For example, the URL may contain one or more targeting parameters. The targeting parameters may provide information to uniquely identify and customize the data with a user and/or groups/types of users. In some embodiments, a web browser may receive and execute the request. By including one or more targeting parameters in the URL, the URL may uniquely identify a user associated with the URL. This may prevent a user from having to log into a website or other location to identify themselves. Instead, the URL may act as a self-identifier and authenticate the user's identity.

The one or more targeting parameters may include a token. For example, a server may generate or create a token which may be used to customize the data. The token may comprise an object which represents the right to perform some operation. For example, in some embodiments, the token may uniquely identify at least one user or at least one group of users and represent the right of the user to download and customize the data. The token may be a session token, a security token, an access token, or the like. A session token may be a unique identifier of an interaction session. A security token may also comprise a hardware token, authentication token cryptographic token. The security token may be a physical device for computer authentication. An access token may be a system object representing the subject of access control parameters. In some embodiments, multiple tokens may be present. The multiple tokens may authenticate different components of the data, or represent information to a server associated with the data.

The customization module 210 may customize the generic data. For example, the customization module 210 may download the generic data. The generic data may be a generic software package or a standard software package. The generic data may be located on a server or on a content delivery network. The customization module 210 may modify the generic data using the one or more targeting parameters. The modification may create customized data associated with a particular user or group of users.

In one embodiment, the customization module 210 may be downloaded code via a web browser associated with the device. The customization module 210 may download the data to the same web browser. For example, the generic data may not be downloaded to the actual device as an installation package but held resident as a data file within the device's web browser. The customization module 210 may then extract information from the URL. For example, the URL may contain one or more targeting parameters embedded in it. The customization module 210 may extract the targeting parameters from the URL and create a customized data or customized data package.

For example, the web browser associated with a device (e.g. device 105) may download and execute the customization module 210 to fabricate customized data. Using a web browser to construct the customized data may prevent denial of service problems potentially related to server resources being consumed. For example, denial of service or distributed denial of service attacks may make a machine or network resource unavailable to users. By moving the construction of the customized software package to the web browser rather than a network device (e.g. server 120), the customization module 210 may prevent denial of service attacks which may prevent users from installing customized data on their devices (e.g. device 105).

In further embodiments, the customization module 210 may pull one or more targeting parameters from the device (e.g. device 105). For example, in some embodiments, the URL may contain targeting parameters. In further embodiments, the customization module 210 may read the URL parameters to place one or more targeting parameters locally on the device. The targeting parameters may be placed in specific locations created especially for the targeting parameters or may be located generally. For example, the targeting parameters may be located in a temporary folder common to all devices. In some embodiments, the customization module 210 may create the temporary folder if one does not exist. Other locations are also possible.

In some embodiments, the customization module 210 may customize the generic data during a step in installation. For example, the customization module 210 may retrieve the one or more targeting parameters from the locally stored location and use the one or more targeting parameters to fabricate the customized data based on the one or more targeting parameters.

The installation module 215 may install the customized data on the device. For example, the installation module 215 may receive or retrieve the customized data from the customization module 210. The installation module 215 may then follow procedures to install the customized data locally on the device. The installation module 215 may make the customized data ready for use on the device. In some embodiments, the installation module 215 may copy the customized data and place it on the device, which may ready the package for execution. In further embodiments, the installation module 215 may follow one or more installation procedures to ready the package for use. The installation procedures may include checking the device system, creating or updating program files or folders, adding configuration data, configuring components, and/or performing package activation. In some embodiments, the installation module 215 may install without user input, while in further embodiments, the user may be required to provide input.

Figure 3:
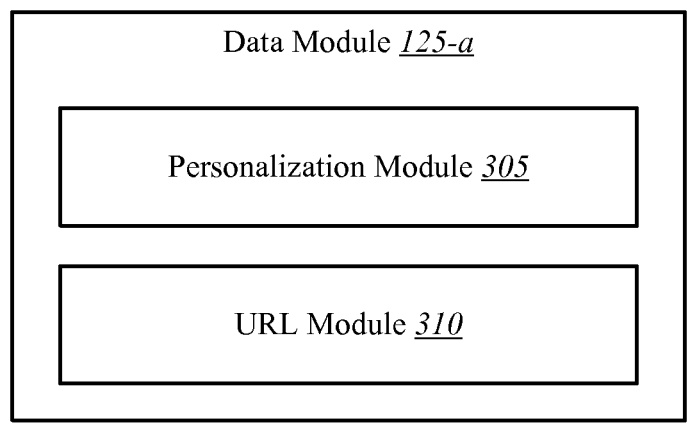
FIG. 3 is a block diagram illustrating one example of a data module.

FIG. 3 is a block diagram illustrating one example of a data module 125-a. The data module 125-a may be one example of the data module 125 depicted in FIG. 1. As depicted, the data module 125-a may include a personalization module 305 and a uniform resource locator (URL) module 310. The data module 125-a may include additional or fewer modules and capabilities in other embodiments. In some embodiments, the data module 125-a may provide customization information and the generic data.

The personalization module 305 may allow the generic data to be customized or personalized to a particular user or group/types of users. For example, the personalization module 305 may provide the information necessary to customize the generic data. The customization information may be one or more targeting parameters. In some embodiments, the one or more targeting parameters may include a token. As mentioned previously, the token may comprise an object which may represent the right to perform some operation. For example, in some embodiments, the token may uniquely identify at least one user or at least one group of users and represent the right of the user to download and customize generic data. In some embodiments, the personalization module 305 may generate the one or more targeting parameters. The targeting parameters may be generated by a server (e.g. server 120).

The URL module 310 may generate a uniform resource locator (URL). The URL may include one or more targeting parameters. For example, the URL may comprise a syntax scheme that specifies how to connect to a server, where to connect to the server, and what information to request from the server. For example, the URL module 310 may generate a URL specific to a user or group of users that requires the user to request generic data and the targeting parameters. In some embodiments, the URL may retrieve the generic data from a content delivery network and the targeting parameters from a different server. In further embodiments, the URL may include a query string. The query string may comprise data to be passed to the software running on the server. In some embodiments, the query string may pass one or more targeting parameters to the web browser associated with the device.

Figure 4:
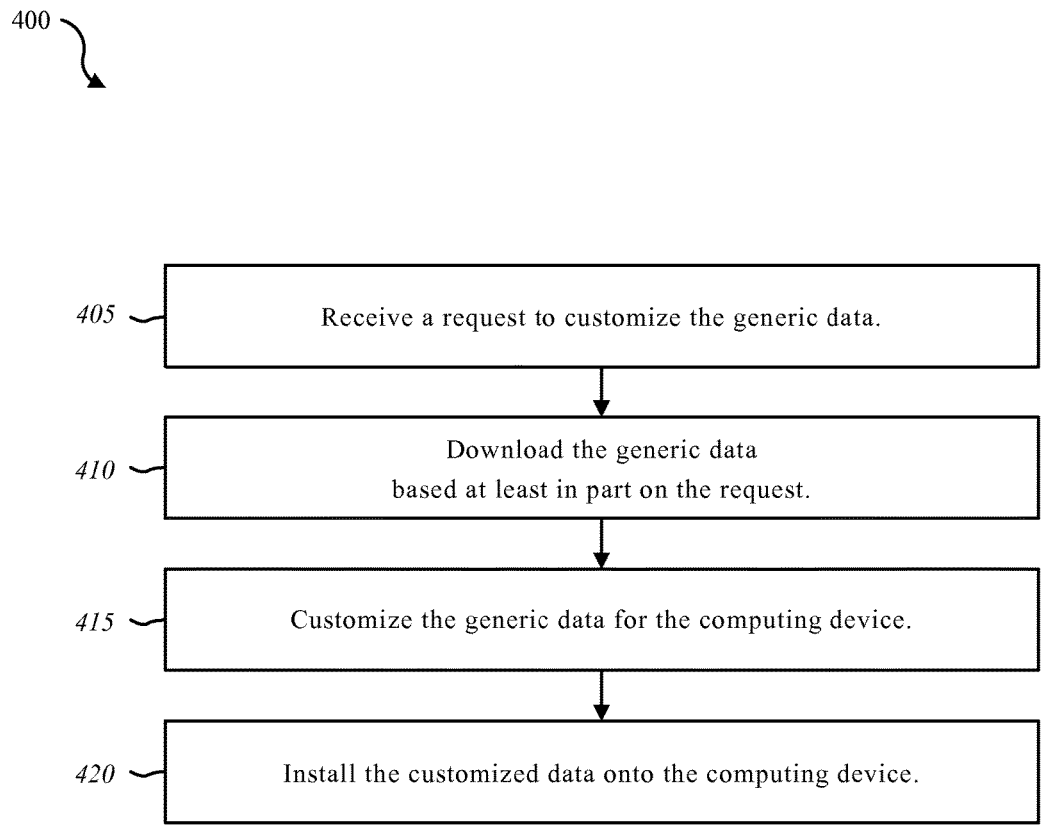
FIG. 4 is a flow diagram illustrating one embodiment of an exemplary method for managing generic data.

FIG. 4 is a flow diagram illustrating one embodiment of a method 400 for managing generic data. In some configurations, the method 400 may be implemented by the management module 115 illustrated in FIGS. 1 and/or 2. In some embodiments, portions the method may be implemented by the management module 115 and/or the data module 125 illustrated in FIGS. 1, 2, and/or 3.

At block 405, a request may be received. The request may include a request to customize generic data. In some embodiments, the request may be in the form of a URL. For example, a user may receive a URL. When activated, the URL may request the customization of generic data. For example, the URL may contain personalization information unique to the user or group of users. The URL may additionally include information regarding which generic data the user wishes to customize.

At block 410, the generic data may be downloaded based at least in part on the request. For example, as mentioned previously, the URL may contain information outlining the generic data. The URL may identify which generic data to download, where the generic data is located, and the like. The URL may additionally include information regarding where the generic data should be downloaded. For example, in some embodiments, the generic data may be downloaded to a web browser. The web browser may download the generic data and hold the generic data resident. In further embodiments, the generic data may be downloaded locally to a computing device (e.g. device 105).

At block 415, the generic data may be customized for the computing device. For example, the generic data may be modified based at least in part on one or more targeting parameters. At block 420, the customized data may be installed on the computing device.

Figure 5:
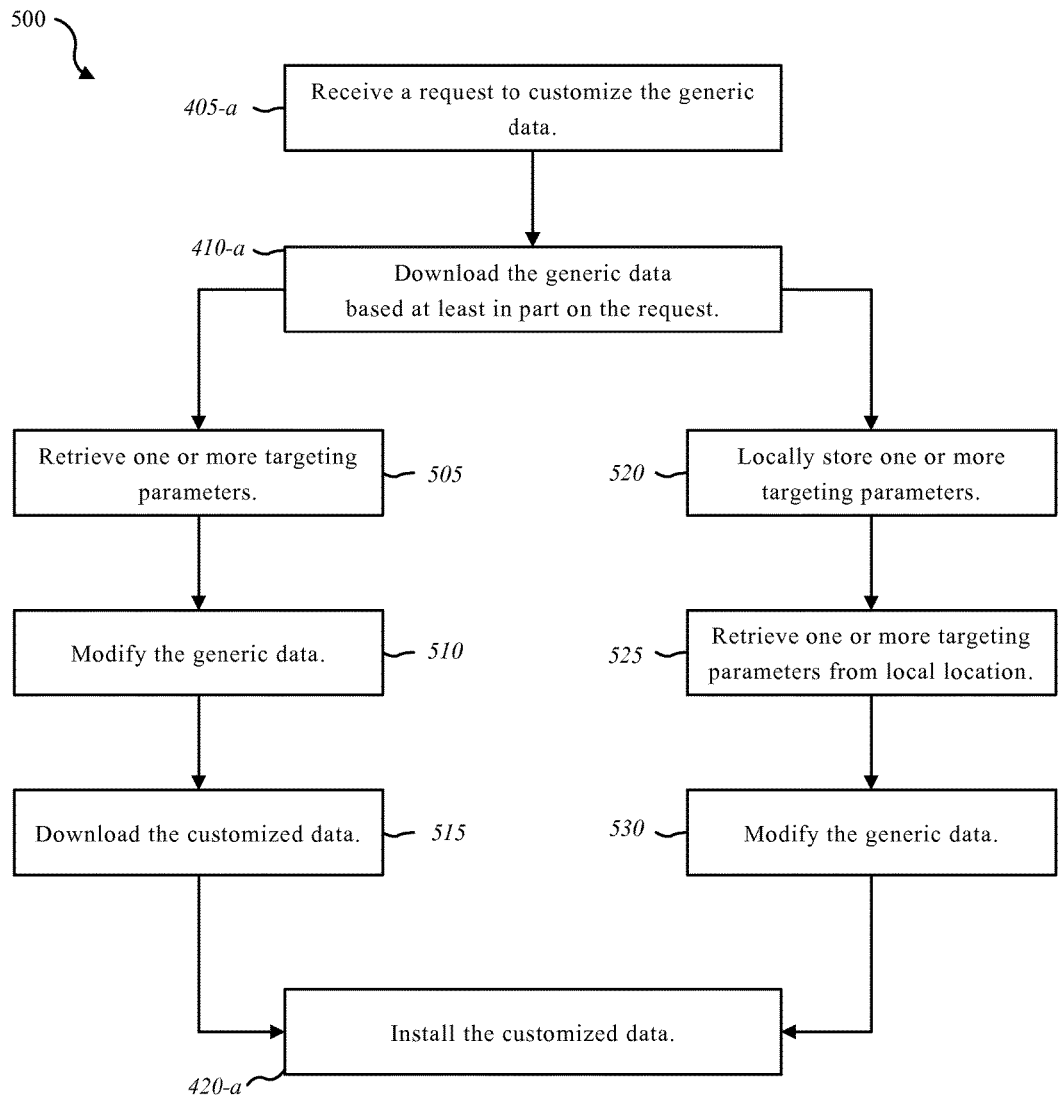
FIG. 5 is a flow diagram illustrating another embodiment of an exemplary method for managing generic data.

FIG. 5 is a flow diagram illustrating one embodiment of a method 500 for managing generic data. In some configurations, the method 500 may be implemented by the management module 115 illustrated in FIGS. 1 and/or 2. In some embodiments, portions the method may be implemented by the management module 115 and/or the data module 125 illustrated in FIGS. 1, 2, and/or 3.

At block 405-*a*, a request to customize the generic data may be received. It may be initiated via a URL. At block 410-*a*, the generic data may be downloaded based at least in part on the request. The generic data may be downloaded locally on the computing device, or may be downloaded and held resident within a web browser associated with the computing device.

If the generic data is downloaded and held resident in a web browser, at block 505, one or more targeting parameters may be retrieved. For example, a URL may contain information embedded into it. The information may relay the one or more targeting parameters, or in alternative embodiments, the information may contain a location of the targeting parameters. In some embodiments, the web browser may retrieve the one or more targeting parameters from the location. The location may be a location local to the computing device or may be a server (e.g. server 120).

At block 510, the generic data may be modified. For example, the web browser may use the one or more targeting parameters to modify the generic data. The modification may result in customized data. For example, the targeting parameters may uniquely identify a user and may customize the data for that particular user. In other embodiments, the targeting parameters may identify a group or types of users. Once the customized data has been fabricated, at block 515, the customized data may be downloaded onto the computing device. For example, the web browser may create the customized data and enable a user to further download the customized data locally onto a computing device.

At block 420-*a*, the customized data may be installed locally on the computing device. For example, procedures may be followed to install the customized data locally on the device. The installation may make the customized data ready for use on the device. In some embodiments, the customized data may be copied and placed on the device, which may ready the package for execution. In further embodiments, one or more installation procedures may ready the package for use.

In alternative embodiments, at block 410-*a*, the generic data may be downloaded locally to a computing device. At block 520, the one or more targeting parameters may be stored locally on the computing device. For example, an administrator may distribute one or more targeting parameters to the device's local storage using independent data distribution methods. The targeting parameters may be stored in a specific location or may be generally stored on the device.

At block 525, the one or more targeting parameters may be retrieved. For example, in some embodiments, the generic data may retrieve the one or more targeting parameters from the locally stored location on the computing device. The generic data may look in specific locations for the one or more targeting parameters, or may generally search the computing device until the targeting parameters are located.

At block 530, the generic data may be modified. For example, the generic data may be modified using the one or more targeting parameters such that the generic data is customized to a particular user or group of users. If the generic data is initially downloaded locally to the device, the modification process may occur during the downloading process or during the installation process. For example, at block 420-*a*, the customized data may be installed. When the installation process is initiated, one of the steps may include modifying the generic data to modify the package to the user. Then, when the installation is complete, customized data is installed on the device and ready for use.

Figure 6:
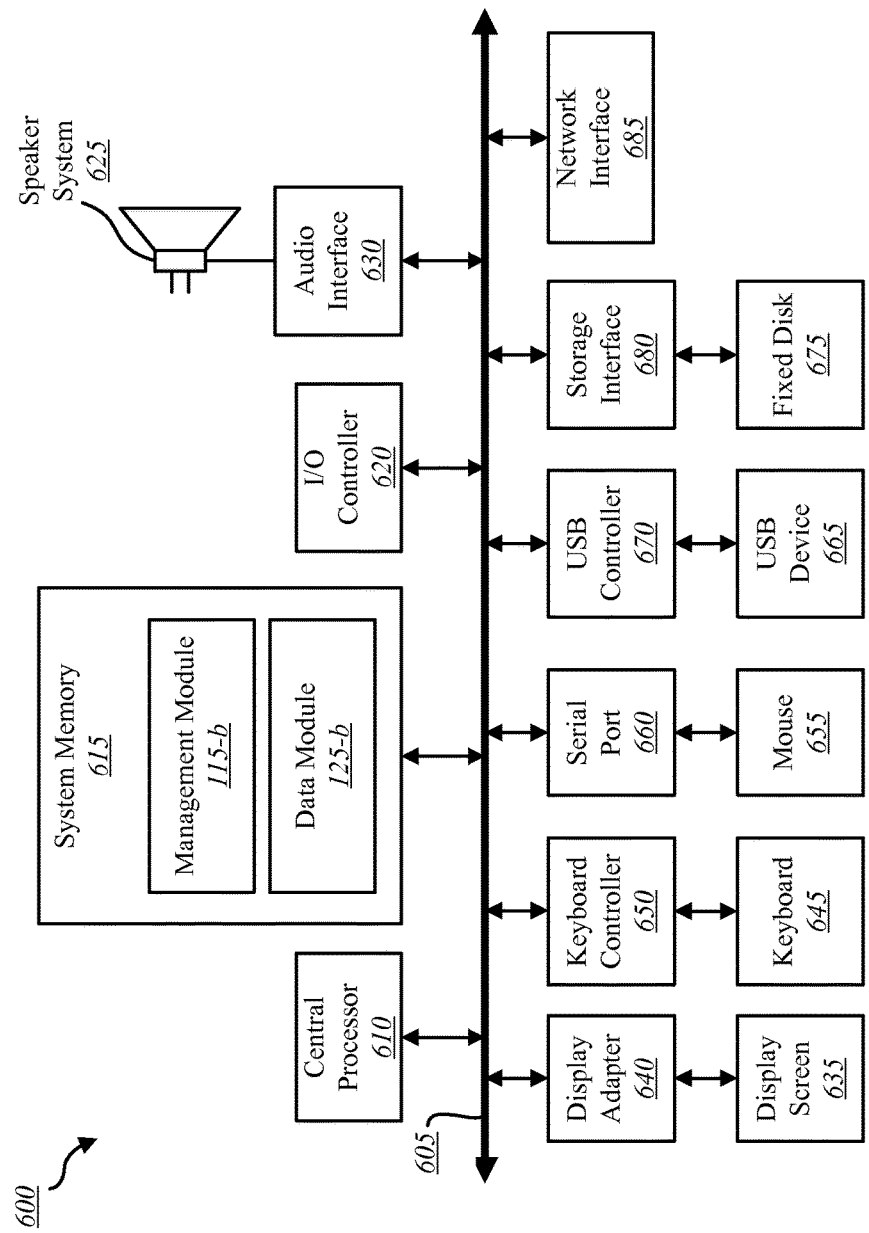
FIG. 6 depicts a block diagram of a computer system suitable for implementing the present systems and methods.

FIG. 6 depicts a block diagram of a computer system 600 suitable for implementing the present systems and methods. Computer system 600 includes a bus 605 which interconnects major subsystems of computer system 600, such as a central processor 610, a system memory 615 (typically RAM, but which may also include ROM, flash RAM, or the like), an input/output controller 625, an external audio device, such as a speaker system 625 via an audio output interface 630, an external device, such as a display screen 635 via display adapter 640, a keyboard 645 (interfaced with a keyboard controller 650) (or other input device), multiple USB devices 665 (interfaced with a USB controller 670), and a storage interface 680. Also included are a mouse 655 (or other point-and-click device) connected to bus 605 through serial port 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the management module 115-*b* and/or the data module 125-*b* to implement the present systems and methods may be stored within the system memory 615. Applications resident with computer system 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of computer system 600, can connect to a standard computer readable medium for storage and/or retrieval of information, such as a fixed disk drive 675. Fixed disk drive 675 may be a part of computer system 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in a non-transitory computer-readable medium such as one or more of system memory 615 or fixed disk 675. The operating system provided on computer system 600 may be iOS®, MS-DOS®, MS-WINDOWS®, OS/2®, UNIX®, LINUX®, or another known operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for establishing customized data for a computing device, comprising:
receiving from a server, by a web browser running on the computing device, a URL generated by the server;
activating, by the web browser running on the computing device, the received URL to request retrieval of generic data from the server, and customization of the generic data for a user of the computing device, the URL comprising one or more targeting parameters including at least a self-identifier for user identification and authentication and one or more rights to perform operations on the generic data;
identifying and authenticating, by the web browser running on the computing device, a user associated with the self-identifier based at least in part on activating the URL, the identifying and authenticating indicating a permission to the one or more rights;
downloading, by the web browser running on the computing device, a module to execute the one or more rights based at least in part on the identifying and authenticating, the module comprising software code executable by the computing device;
downloading, by the module, the generic data from the server to a memory associated with the web browser based at least in part on the request, the generic data resident as a data file within the web browser;
extracting, by the module, a first type of token and a second type of token from the one or more targeting parameters, and storing the first type of token and the second type of token at a local memory of the computing device;
customizing, by the web browser running on the computing device, the generic data based at least in part on retrieving, by the module, the first type of token and the second type of token from the local memory, and modifying the generic data based at least in part on the first type of token and the second type of token; and
responsive to customizing the generic data by the web browser running on the computing device, installing, by the web browser, the customized generic data onto the computing device.

2. The method of claim 1, further comprising:
generating the URL, the URL comprising the one or more targeting parameters to relay information to customize the generic data, wherein the URL is generated by the server.

3. The method of claim 1, wherein the web browser retrieves the one or more targeting parameters from a server distinct from the generic data, and customizes the generic data based at least in part on the one or more targeting parameters.

4. The method of claim 3, wherein the web browser enables a user to download the customized data to local memory of the computing device.

5. The method of claim 1, further comprising:
creating a token to customize the generic data, wherein the token is one of the one or more targeting parameters.

6. The method of claim 5, wherein the token uniquely identifies at least one user or at least one type of user.

7. The method of claim 1, wherein the generic data is initially located on a content delivery network.

8. The method of claim 1, wherein customizing the generic data further comprises:
modifying the generic data based at least in part on one or more targeting parameters locally stored on the computing device.

9. The method of claim 8, further comprising:
storing the one or more targeting parameters unique to the computing device locally on the computing device.

10. The method of claim 9, further comprising:
retrieving the one or more targeting parameters locally stored on the computing device.

11. The method of claim 1, wherein installing the customized data further comprises:
downloading the customized data to the computing device.

12. A computing device configured to establish customized data, comprising:
a processor;
memory in electronic communication with the processor;

instructions stored in the memory, the instructions being executable by the processor to:

receive from a server, by a web browser running on the computing device, a URL generated by the server;

activate, by the web browser running on the computing device, the received URL to request retrieval of generic data from the server, and customization of the generic data for a user of the computing device, the URL comprising one or more targeting parameters including at least a self-identifier for user identification and authentication and one or more rights to perform operations on the generic data;

identify and authenticate, by the web browser running on the computing device, a user associated with the self-identifier based at least in part on activating the URL, the identifying and authenticating indicating a permission to the one or more rights;

download, by the web browser running on the computing device, a module to execute the one or more rights based at least in part on the identifying and authenticating, the module comprising software code executable by the computing device;

download, by the module, the generic data from the server to a memory associated with the web browser based at least in part on the request, the generic data resident as a data file within the web browser;

extract, by the module, a first type of token and a second type of token from the one or more targeting parameters, and storing the first type of token and the second type of token at a local memory of the computing device;

customize, by the web browser running on the computing device, the generic data based at least in part on retrieving, by the module, the first type of token and the second type of token from the local memory, and modifying the generic data based at least in part on the first type of token and the second type of token; and responsive to customizing the generic data by the web browser running on the computing device, install, by the web browser, the customized generic data onto the computing device.

13. The computing device of claim 12, wherein the web browser retrieves the one or more targeting parameters from a server distinct from the generic data, and customizes the generic data based at least in part on the one or more targeting parameters.

14. The computing device of claim 13, wherein the web browser enables a user to download the customized data to local memory of the computing device.

15. The computing device of claim 12, wherein the generic data is initially located on a content delivery network.

16. A computer-program product for establishing, by a processor, customized data, the computer-program product comprising a non-transitory computer-readable medium storing instructions thereon, the instructions being executable by the processor to:

receive from a server, by a web browser running on the computing device, a URL generated by the server;

activate, by the web browser running on the computing device, the received URL to request retrieval of generic data from the server, and customization of the generic data for a user of the computing device, the URL comprising one or more targeting parameters including at least a self-identifier for user identification and authentication and one or more rights to perform operations on the generic data;

identify and authenticate, by the web browser running on the computing device, a user associated with the self-identifier based at least in part on activating the URL, the identifying and authenticating indicating a permission to the one or more rights;

download, by the web browser running on the computing device, a module to execute the one or more rights based at least in part on the identifying and authenticating, the module comprising software code executable by the computing device;

download, by the module, the generic data from the server to a memory associated with the web browser based at least in part on the request, the generic data resident as a data file within the web browser;

extract, by the module, a first type of token and a second type of token from the one or more targeting parameters, and storing the first type of token and the second type of token at a local memory of the computing device;

customize, by the web browser running on the computing device, the generic data based at least in part on retrieving, by the module, the first type of token and the second type of token from the local memory, and modifying the generic data based at least in part on the first type of token and the second type of token; and responsive to customizing the generic data by the web browser running on the computing device, install, by the web browser, the customized generic data onto the computing device.

17. The computer-program product of claim 16, wherein the web browser enables a user to download the customized data to local memory of the computing device.

* * * * *